Figure 1:
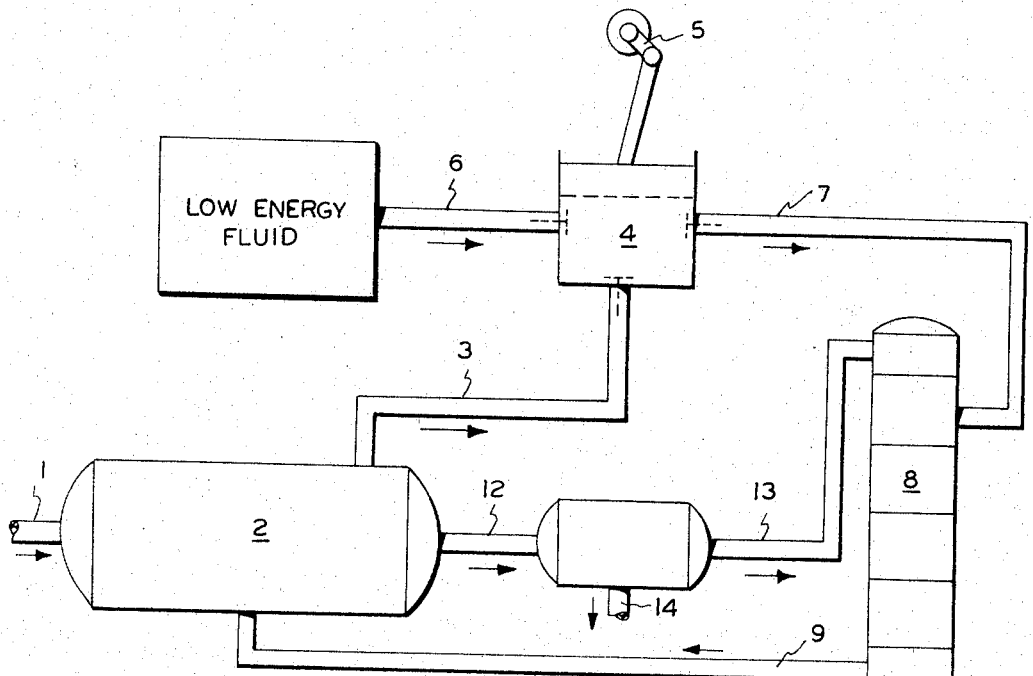

Nov. 7, 1967   J. W. PIKE   3,350,891
FREEZE CONCENTRATION PROCESS
Filed June 5, 1964

INVENTOR
JOHN W. PIKE

BY *Plumley, Tyner & Sandt*
ATTORNEYS

United States Patent Office 3,350,891
Patented Nov. 7, 1967

3,350,891
FREEZE CONCENTRATION PROCESS
John W. Pike, New Rochelle, N.Y., assignor to Struthers Scientific and International Corporation, a corporation of Delaware
Filed June 5, 1964, Ser. No. 372,784
9 Claims. (Cl. 62—58)

This invention relates to an improvement in the freeze concentration process; and, more particularly, it relates to an improvement in the utilization of heat in the freeze concentration process.

In my United States Patent 2,997,856 which was issued Aug. 29, 1961, there is described and claimed a process for preparing fresh water from salt water by means of a process involving the freezing of the water in the salt water solution, and after washing salt water from the frozen water, melting the frozen water to prepare fresh water. A more generalized description of this process may be found in an article by James F. Houle entitled "Freeze-Desalting of Seawater Goes Into Operation," Chemical Engineering, Jan. 6, 1964, pages 64–66. In both of these descriptions a hydrocarbon refrigerant, such as n-butane, is employed in direct contact with the salt water solution to be desalted. The cooling effect is produced by introducing the hydrocarbon refrigerant into the freezing zone as a liquid and permitting the liquid to absorb sufficient heat from the freezing salt water to convert the liquid refrigerant to a vapor.

In the portion of the freeze-desalting process where the salt water is subjected to freezing conditions, the liquid hydrocarbon is added directly to the salt water, and since the hydrocarbon is not miscible with water, there is no special problem in recovering the hydrocarbon. The hydrocarbon, which is vaporized through its refrigerating effect, must be reliquified if it is to be recirculated in the process. The normal method of preparing the hydrocarbon for reuse is to compress the hydrocarbon vapors and cool the vapors to cause liquefaction, following which, the liquid hydrocarbon is ready for reuse as a refrigerant. The cost of compressing and cooling the hydrocarbon vapors is not a negligible expense and any method of reducing such expense is a desirable improvement.

It is an object of this invention to provide an efficient, continuous process for freeze concentration. It is another object of this invention to provide an improved step in the freeze-concentration process involving recirculating a refrigerant which is immiscible with the solution. It is still another object of this invention to provide a method of utilizing heat from low energy sources, such as waste water or low pressure steam, to raise the efficiency of compression. It is yet another object of this invention to eliminate the need for costly energy sources such as electric power, high pressure steam, nuclear energy, or other fossil fuels. Other objects will appear from the more detailed description of this invention found elsewhere herein.

The above objects are accomplished by introducing into the zone where the vaporized refrigerant is to be compressed heat from a low energy source to raise the enthalpy of the vapor, and thereby to reduce or to eliminate the work load of a compressing device. A highly preferable means is to introduce hot water, steam, or other suitable waste heat fluid into the cylinder of a reciprocating compressor just prior to the compression stroke so as to raise the temperature and/or pressure of the refrigerant vapor being compressed. Another highly preferable means is to employ a two cycle compression system and to introduce hot water, steam, or other suitable waste heat fluid into the compressor cylinder at the end of the first cycle, thereby increasing the temperature and/or pressure of the refrigerant which is emitted during the second cycle.

Figure 2:
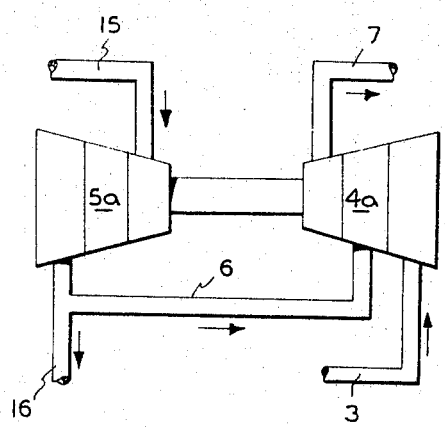
Figure 3:
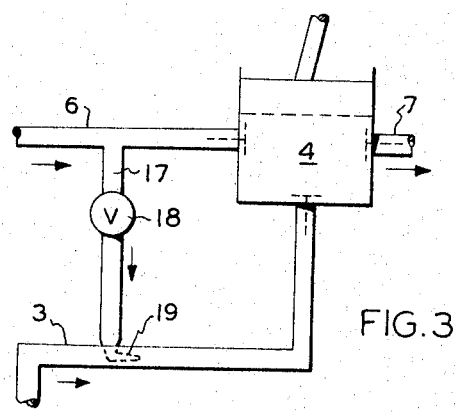

A better understanding of the invention may be obtained by reference to the attached drawing, FIGURE 1, which is a flow sheet of a portion of a freeze concentration process particularly illustrating the flow of the refrigerant. FIGURE 2 is an alternate means of compression for use in place of the one illustrated in FIGURE 1. FIGURE 3 is an optional means for introducing the low energy fluid into the refrigerant which is to be compressed by the means illustrated in FIGURE 1 or 2.

In FIGURE 1, a solution enters the process at 1. This solution may be sea water, brackish water, polluted water, industrial waste, sewage, chemical solutions, fruit or vegetable juices, root or bean extracts, or other concentrations using direct contact heat transfer with an immiscible refrigerant. Thus, the feed solution enters crystallizer 2 through line 1. There is also fed into crystallizer 2 a liquid, water-immiscible, refrigerant through line 9. This refrigerant may be almost any convenient lower hydrocarbon, i.e., one having from about 2–10 carbon atoms per molecule, irrespective of whether the hydrocarbon is saturated, unsaturated, cyclic or acyclic. The choice of hydrocarbon normally depends upon the vapor-liquid characteristics of the hydrocarbon and the freezing characterisitcs of the solution being concentrated. A preferred refrigerant for use in the freeze-concentration of salt water is n-butane. Other related hydrocarbons which may be employed include, but are not limited to, ethane, ethylene, propane, propylene, isobutane, butylene, cyclohexane, cyclohexene, 1,3-butadiene, n-heptane, and n-decane. Still other refrigerants that are equally useful are the fluorocarbons known commercially as "Freons," and, in particular, those having 1–6 carbon atoms per molecule.

In crystallizer 2, if the proper balance is maintained between the flow in lines 1 and 9, crystals of ice will form as the liquid refrigerant absorbs heat and vaporizes thereby. Refrigerant vapor leaves via line 3 and a slurry of ice crystals and a concentrated form of the original solution leave via line 12. In separator 11, the ice crystals are separated from the remaining solution providing a concentrated solution as a product at line 14 and ice crystals at line 13. The solution in line 14 is the same as that entering the process through line 1 except that the solution in line 14 has been concentrated by the removal of solvent equivalent to that in the ice crystals in line 13. In the case where the solution in line 1 is sea water, the crystals in line 13 are substantially free of salt while the solution in line 14 is stronger in salt than that in line 1.

Ice crystals from line 13 are fed into a melter-condenser 8 where the ice is melted. In the case of preparing fresh water from salt water the product of this step, recovered in line 10, is the end-product of the entire process; i.e., the fresh water which is the desired end-product of the desalination of sea water is recovered from line 10 although there may be minor clean-up steps applied to this product before it is used for human consumption or other purposes. Melter-condenser 8 also serves to condense the refrigerant from a vapor entering melter-condenser 8 through line 7 to a liquid which leaves via line 9 to be reused again in crystallizer 2.

In order for the refrigerant vapor in line 3 to be converted to a liquid in line 9 it is necessary to raise the pressure of the vapor in line 3 by mechanical compression or by supplying heat energy so that the heat removed in melter-condenser will be sufficient to condense the vapor. In FIGURE 1, a reciprocating compressor is illustrated schematically at 4 with a power source and crankshaft at 5. Low pressure refrigerant vapor enters the cylinder of the compressor through line 4 and high pressure vapor leaves through line 7. It is a principal object of this invention to utilize waste streams of low energy water or steam to raise the overall efficiency of heat utilization in the compressing operation. A source of low energy water or steam is shown entering compressor 4 through line 6. These low energy materials broadly encompass water or steam at temperatures of at least about 80° F. and at pressures of about 1 atmosphere or more. It is, of course, entirely possible to utilize streams of compounds other than water or steam, providing those compounds do not react chemically with the refrigerant or contaminate the solution being concentrated. Thus, when the freeze-concentration process deals with aqueous solutions, it is most convenient and desirable to employ water or steam since no new variable is added to the system.

The cycle of the reciprocating compressor and the opening and closing of the three valves is, as follows:

(1) When the piston is in the "down" position and starting the suction stroke, the valve in line 3 opens to admit low pressure refrigerant vapor. The other two valves are closed.

(2) By the time the piston reaches the "up" position (as shown in FIGURE 1) the valve in line 3 closes and the piston starts the compression stroke.

(3) Immediately after the compression stroke starts, the valve in line 6 opens to admit steam, water, or other waste heat fluid, preferably at a temperature of 80° F. to 250° F. and at a pressure sufficiently high to be injected and atomized into the cylinder of compressor 4.

(4) The heat in the injected fluid raises the pressure and temperature of the refrigerant in the cylinder.

(5) The piston continues through the compression stroke until the valve in line 7 opens to discharge high pressure refrigerant vapor containing the injected waste heat fluid, and thereby completing the cycle which is ready to start again at step 1.

When compressor 4 of FIGURE 1 operates on a two cycle system the valves function, as follows:

(1) When the piston is in the "down" position and starting the suction stroke, the valve in line 3 opens to admit low pressure refrigerant vapor. The other two valves are closed.

(2) By the time the piston reaches the "up" position (as shown in FIGURE 1) the valve in line 3 closes and the piston starts the compression stroke.

(3) At the end of the compression stroke when the piston has completed the first cycle the valve in line 6 opens to admit steam, water, or other waste heat fluid at a temperature of 80° F. to 250° F. and at a pressure sufficiently high to be injected into the cylinder of compressor 4.

(4) The heat in the injected fluid raises the pressure or temperature of the refrigerant in the cylinder as the piston continues through the "up" stroke of the second cycle transferring energy to the crankshaft.

(5) During the final "down" stroke of the second cycle the valve in line 7 opens to discharge the compressed refrigerant containing the injected waste heat fluid.

(6) The valve in line 7 closes at the "down" position of the cylinder thus completing the two cycles with the compressor ready to start again at step 1.

A variation of this process may be seen by reference to FIGURE 2 where lines 3, 6, and 7 are intended to denote the same lines as those in FIGURE 1. The device illustrated in FIGURE 2 is a turbine or a centrifugal compressor. The portion at 4a compresses the refrigerant vapor while the portion at 5a is a steam or gas turbine driven by high pressure steam or gas in line 15. Thus turbine 5a may be a power turbine in a plant manufacturing electrical power and on the same shaft driving the compressor 4a. High pressure steam enters the turbine in line 15, passes through the various stages of the turbine and leaves through line 16 as low pressure steam. Low pressure refrigerant vapor enters the compressor via line 3 and progresses through the necessary stages to leave as high pressure vapor in line 7. At a convenient inlet where the pressure and temperature conditions are appropriate, a portion of the low pressure steam in line 16 is bled off through line 6 and injected into compressor 4a to raise the presssure of the refrigerant vapor in the same manner as that described above with respect to the reciprocating compressor of FIGURE 1.

FIGURE 3 illustrates an optional means for introducing from a low energy source into the refrigerant vapors which must be compressed. Although reciprocating compressor 4 is shown in FIGURE 3, it is to be understood that centrifugal compressor 4a (of FIGURE 2) is equally applicable in this process. Lines 3, 6, and 7 denote the same lines as those described in FIGURES 1 and 2. A portion of the low energy fluid in line 6 is by-passed through line 17, valve 18, and injection nozzle 19 into line 3 containing the low pressure refrigerant vapors entering the compressor. A typical method of operation would be for valve 18 to be partially opened during the time the valve in line 3 is open admitting refrigerant vapors to the compressor. Injection nozzle 19 increases the velocity of the fluid in the nozzle and thereby assists in drawing the refrigerant vapors from crystallizer 2 as well as to raise the energy of those vapors and to increase the rate of flow into compressor 4.

It may be seen, using n-butane as the refrigerant, that at about 15 p.s.i.a., saturated vapor is at a temperature of 32° F. and has an enthalpy of 285 B.t.u./lb. If saturated steam at 2 atmospheres is avilable, less than 0.02 lb. of steam per lb. of butane is needed to raise the pressure of the butane 10 p.s.i., and to superheat it 20° F. Other hydrocarbon and fluorocarbon refrigerants exhibit similar thermodynamic properties illustrating the small amount of waste heat energy needed to raise the temperature and/or pressure of the refrigerant vapor. For example, saturated isobutane vapor at 1 atmosphere pressure has a temperature of 10° F. This vapor may be increased approximately 10 p.s.i., in pressure and superheated 20° F. by a heat expenditure of about 14 B.t.u./lb. of isobutane. Similarly, in the case of propane, saturated vapor at 30° F. and 66 p.s.i.a., may be raised to a pressure of 78 p.s.i.a., and superheated 20° F. by adding 9 B.t.u./lb. of propane. Difluorodichloromethane, a "Freon" known by the code "F–12," can be changed from a saturated vapor at 20° F. and 36 p.s.i.a., to a vapor at 52 p.s.i.a., and 60° F. at an expense of approximately 4 B.t.u./lb. of "Freon." It, therefore, is apparent that the work load of the compressor may be drastically reduced or even eliminated in instances where the increase of pressure on the refrigerant is modest and where the low energy waste heat fluids are of the most desirable type, i.e., steam of about 2 atmospheres pressure, and water at a temperature of about 200° F.

The process described herein is illustrative of the preferred mode of embodiment and it is to be understood that many types of modifications can be introduced without departing from the spirit of this invention.

I claim:

1. In a continuous freeze concentration process wherein an aqueous solution is intimately contacted with a vaporizing, water-immiscible, liquid refrigerant causing a portion of the water in the solution to freeze and the said refrigerant to vaporize, and wherein the vaporized refrigerant is compressed, condensed and reused as the said refrigerant liquid, the improvement which comprises raising the energy of said refrigerant vapor by injecting into said refrigerant vapor just prior to being compressed a minor amount of a fluid selected from the group consisting of steam and water at at temperature of at least about 80° F.

2. In a continuous freeze concentration process wherein an aqueous solution is intimately contacted with a vaporizing, water-immiscible, liquid refrigerant from the group consisting of hydrocarbons and fluorocarbons, causing a portion of the water in the solution to freeze and the said refrigerant to vaporize, and wherein the vaporized refrigerant is compressed, condensed and reused as the said refrigerant liquid, the improvement which comprises supplying at least a portion of the energy needed to compress the refrigerant vapor by an injection of steam of at least 80° F. into the refrigerant vapor being compressed.

3. In a continuous freeze concentration process wherein an aqueous solution is intimately contacted with a vaporizing water-immiscible, liquid refrigerant from the group consisting of hydrocarbons and fluorocarbons, causing a portion of the water in the solution to freeze and the said refrigerant to vaporize, and wherein the vaporized refrigerant is compressed, condensed and reused as the said refrigerant liquid, the improvement which comprises supplying all of the energy needed to raise the pressure and temperature of the refrigerant by direct contact heat exchange with at least one fluid from the group consisting of steam and water stream at a temperature of at least about 80° F.

4. In a continuous process for desalting sea water in which a liquid hydrocarbon is vaporized in direct contact with sea water to cause the formation of ice crystals and in which the said hydrocarbon is recirculated through a series of steps of recompression of said vapor and condensation of said vapor to liquefy said hydrocarbon for reuse in direct contact with sea water, the improvement which comprises introducing into a compressor said hydrocarbon vapor after said direct contact with sea water, injecting into said compressor a minor amount of water at a temperature of at least about 80° F. to cause an increase in the energy of the said hydrocarbon.

5. The process of claim 4 in which said water is in the form of steam.

6. The process of claim 4 in which said water is in the form of steam and in which said compressor is a reciprocating positive displacement compressor.

7. The process of claim 4 in which said water is in the form of steam and in which said compressor is a centrifugal compressor.

8. The process of claim 4 in which said hydrocarbon has 2–10 carbon atoms per molecule.

9. In a continuous freeze concentration process wherein an aqueous solution is intimately contacted with a vaporizing, water-immiscible, liquid refrigerant causing a portion of the water in the solution to freeze and the said refrigerant to vaporize, and wherein the vaporized refrigerant is compressed, condensed and reused as the said refrigerant liquid, the improvement which comprises raising the energy of said refrigerant vapor in the compression zone where the refrigerant vapor is being compressed by an injection into said refrigerant vapor of a minor amount of a fluid at a temperature of at least about 80° F., said injection comprising introducing a portion of said fluid directly into said compression zone and by introducing another portion of said fluid through an injection nozzle into the uncompressed refrigerant vapor prior to its entrance into the said compression zone.

References Cited
UNITED STATES PATENTS 2,997,856    8/1961    Pike _____ 65—58
3,217,505    11/1965    Turner _____ 62—58

NORMAN YUDKOFF, *Primary Examiner.*

G. P. HINES, *Assistant Examiner.*